United States Patent
Hirouchi

(10) Patent No.: US 9,432,545 B2
(45) Date of Patent: Aug. 30, 2016

(54) INFORMATION PROCESSING APPARATUS, METHOD OF CONTROLLING THE SAME, AND STORAGE MEDIUM FOR CONTROLLING TRANSITION TO A SLEEP MODE AND SETTING OF AN INTERRUPT SETTING IN ACCORDANCE WITH RECEPTION OF DATA

(71) Applicant: CANON KABUSHIKI KAISHA, Tokyo (JP)

(72) Inventor: Yasuo Hirouchi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/691,948

(22) Filed: Apr. 21, 2015

(65) Prior Publication Data

US 2015/0319327 A1 Nov. 5, 2015

(30) Foreign Application Priority Data

May 2, 2014 (JP) ................................ 2014-095504

(51) Int. Cl.
*G06F 3/12* (2006.01)
*H04N 1/00* (2006.01)
*H04N 1/32* (2006.01)

(52) U.S. Cl.
CPC ........ *H04N 1/00928* (2013.01); *H04N 1/0022* (2013.01); *H04N 1/00896* (2013.01); *H04N 1/00925* (2013.01); *H04N 1/32683* (2013.01); *H04N 2201/0094* (2013.01)

(58) Field of Classification Search
CPC ........... H04N 1/0022; H04N 1/00896; H04N 1/00928; H04N 1/00891; H04N 1/00925; H04N 1/32683; G06F 3/1221; G06F 1/3203

USPC ........................................................ 358/1.13
See application file for complete search history.

(56) References Cited

U.S. PATENT DOCUMENTS

| 7,765,413 | B2 | 7/2010 | Senda |
| 2002/0178389 | A1* | 11/2002 | Satoh ................. H04N 1/00896 713/310 |
| 2008/0141050 | A1 | 6/2008 | Senda |
| 2009/0150582 | A1* | 6/2009 | Diefenbaugh ........ G06F 13/385 710/100 |
| 2013/0235406 | A1* | 9/2013 | Umeda .............. H04N 1/00896 358/1.13 |
| 2014/0112656 | A1* | 4/2014 | Yamashita .............. H04L 12/44 398/58 |
| 2014/0313531 | A1* | 10/2014 | Kojima .............. H04N 1/00896 358/1.13 |

FOREIGN PATENT DOCUMENTS

JP 2007-068156 A 3/2007

OTHER PUBLICATIONS

English Machine Translation of JP 2013-187590-A (Umeda, Published Sep. 19, 2013).*

* cited by examiner

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

An information processing apparatus having an interface for communicating with an external apparatus, and a method of controlling the same, detect that a transition condition for the information processing apparatus to transition into a sleep mode is satisfied; and cancel, in a case where an interrupt from the interface occurs during an interval from a timing of that it is detected that the transition condition is satisfied to a timing of that the transition to the sleep mode completes, the transition to the sleep mode.

13 Claims, 10 Drawing Sheets

INFORMATION PROCESSING APPARATUS, METHOD OF CONTROLLING THE SAME, AND STORAGE MEDIUM FOR CONTROLLING TRANSITION TO A SLEEP MODE AND SETTING OF AN INTERRUPT SETTING IN ACCORDANCE WITH RECEPTION OF DATA

BACKGROUND OF THE INVENTION

1. Field of the Invention

The present invention relates to an information processing apparatus, a method of controlling the same, and a storage medium.

2. Description of the Related Art

A printer apparatus such as a printer, a multi-function peripheral, or the like, that has a USB (Universal Serial Bus) I/F (interface) communicates through the USB I/F to a host PC (PC), and receives and performs printing of print data which is transmitted from the PC. In the case that this kind of printer apparatus communicates with a PC via a USB I/F, communication is performed while a handshake is performed between a print driver that exists on the PC, and a module which performs print processing on the printer apparatus. There exist two types of communication for this kind of communication between a PC and a printer apparatus: bidirectional communication and unidirectional communication.

In addition to bidirectional communication and unidirectional communication via the USB I/F, the PC is always in charge of communication control, and it is not possible for the printer apparatus to have the control. However, in the case of the bidirectional communication, since it is possible to communicate an intent of the printer apparatus, in the case that the printer apparatus wishes to transition to a sleep state, a transition to sleep state may be performed after a handshake is performed with the PC before the transition to the sleep state. On the other hand, in the case of the unidirectional communication, since it is not possible to notify the PC of the intent of a printer apparatus, even in a case where the printer apparatus wishes to transition to the sleep state, it is not able to notify the PC of the transition into the sleep state.

Japanese Patent Laid-Open No. 2007-68156 describes that, when a printer advances processing for transitioning to a sleep state, DMA for receiving data is stopped, and thereafter a printer is set such that it responds with a NAK (Negative ACKnowledge).

When the printer apparatus transitions to a sleep state, there is a possibility that when print data is transmitted from the PC to the printer apparatus, due to the transmission timing, a part of the print data is received, and there is the remaining data disappears. However, in the above described Japanese Patent Laid-Open No. 2007-68156, support is not made for an action in the case when timing for a printer performing transition processing to a sleep state and timing for print data being transmitted from a PC to the printer matches during the unidirectional communication.

SUMMARY OF THE INVENTION

An aspect of the present invention is to eliminate the above-mentioned problems with conventional technology.

A feature of the present invention is to provide a technique of preventing loss of data input when an image forming apparatus transitions into a power saving state.

According to a first aspect of the present invention, there is provided an information processing apparatus having an interface for communicating with an external apparatus, the information processing apparatus comprising: a detection unit configured to detect that a transition condition for the information processing apparatus to transition into a sleep mode is satisfied; and a cancelling unit configured to cancel, in a case where an interrupt from the interface occurs during an interval from a timing of that the detection unit detects that the transition condition is satisfied to a timing of that the transition to the sleep mode completes, the transition to the sleep mode.

According to a second aspect of the present invention, there is provided a method of controlling an information processing apparatus having an interface for communicating with an external apparatus, the method comprising: detecting that a transition condition for the information processing apparatus to transition into a sleep mode is satisfied; and cancelling, in a case where an interrupt from the interface occurs during an interval from a timing of that it is detected the detecting that the transition condition is satisfied to a timing of that the transition to the sleep mode completes, the transition to the sleep mode.

Further features of the present invention will become apparent from the following description of exemplary embodiments with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that, in the present embodiment, an explanation will be given of an image forming apparatus of the present invention as an example of a multi-function peripheral that comprises a plurality of functions such as those for printing and scanning, but the present invention is not limited to this kind of multi-function peripheral.

Figure 1:
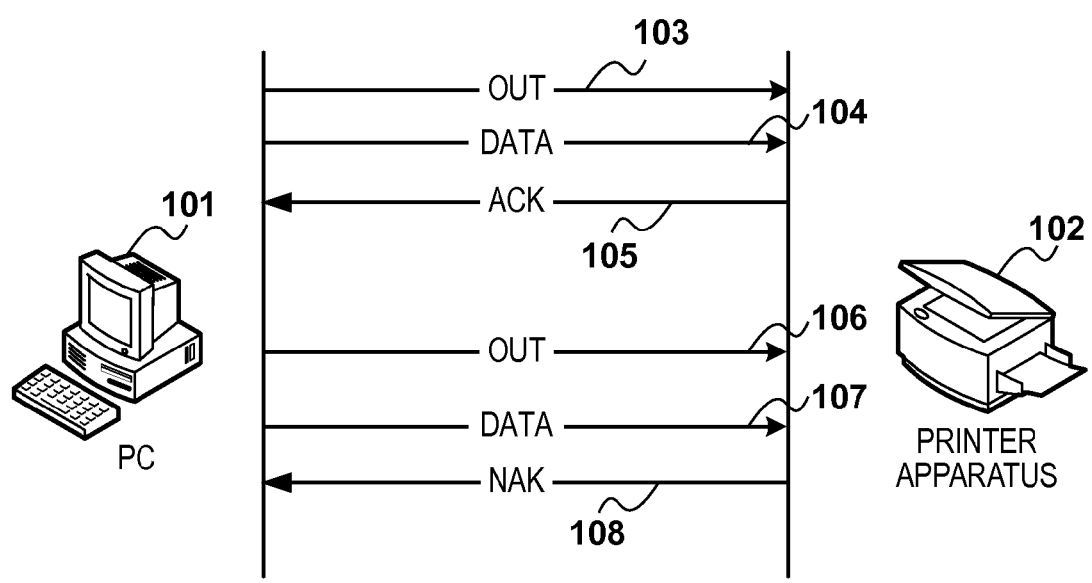
FIG. 1 depicts a view for explaining an exchange of a signal between a host PC (PC) and a printer apparatus, in the case of performing unidirectional communication via a USB I/F

FIG. 1 depicts a view for explaining an exchange of signals between a printer apparatus 102 and a host PC 101 (hereinafter referred to as the PC) in the case of performing unidirectional communication via a USB I/F.

Firstly, the PC 101, which is an external device, transmits an output command 103 which indicates an output of data to the printer apparatus 102, and thereafter the PC 101 transmits data 104 to the printer apparatus 102. In the case that the printer apparatus 102 receives the data 104, the printer apparatus 102 replies with an ACK 105 that indicates a reception of data. With this, the PC 101 determines that transmission of the data 104 succeeded by the ACK 105. This is a case when transmission of data from the PC 101 to the printer apparatus 102 has terminated normally.

On the other hand, an explanation will be given of a case where data that is transmitted from the PC 101 could not be received normally by the printer apparatus 102. The PC 101 transmits an output command 106 for indicating an output of data to the printer apparatus 102, and thereafter data 107 is transmitted from the PC 101 to the printer apparatus 102. In the case that the data 107 could not be received normally by the printer apparatus 102, a NAK 108 is returned to show that the data 107 could not be received normally by the printer apparatus 102. Because of this, the PC 101 determines that the data 107 could not be received normally by the printer apparatus 102.

In the case of this kind of unidirectional communication, data (including commands) is always transmitted from the PC 101 to the printer apparatus 102, and the printer apparatus 102 can only reply using the ACK 105 or the NAK 108. For these reasons, the printer apparatus 102 is not able to notify the PC 101 of a transition to a sleep state (a power saving state). In such a case when print data is transmitted from the PC 101 to the printer apparatus 102 at a timing that the printer apparatus 102 transitions to the sleep state, there is a problem in that the print data may disappear due to the timing.

First Embodiment

Figure 2:
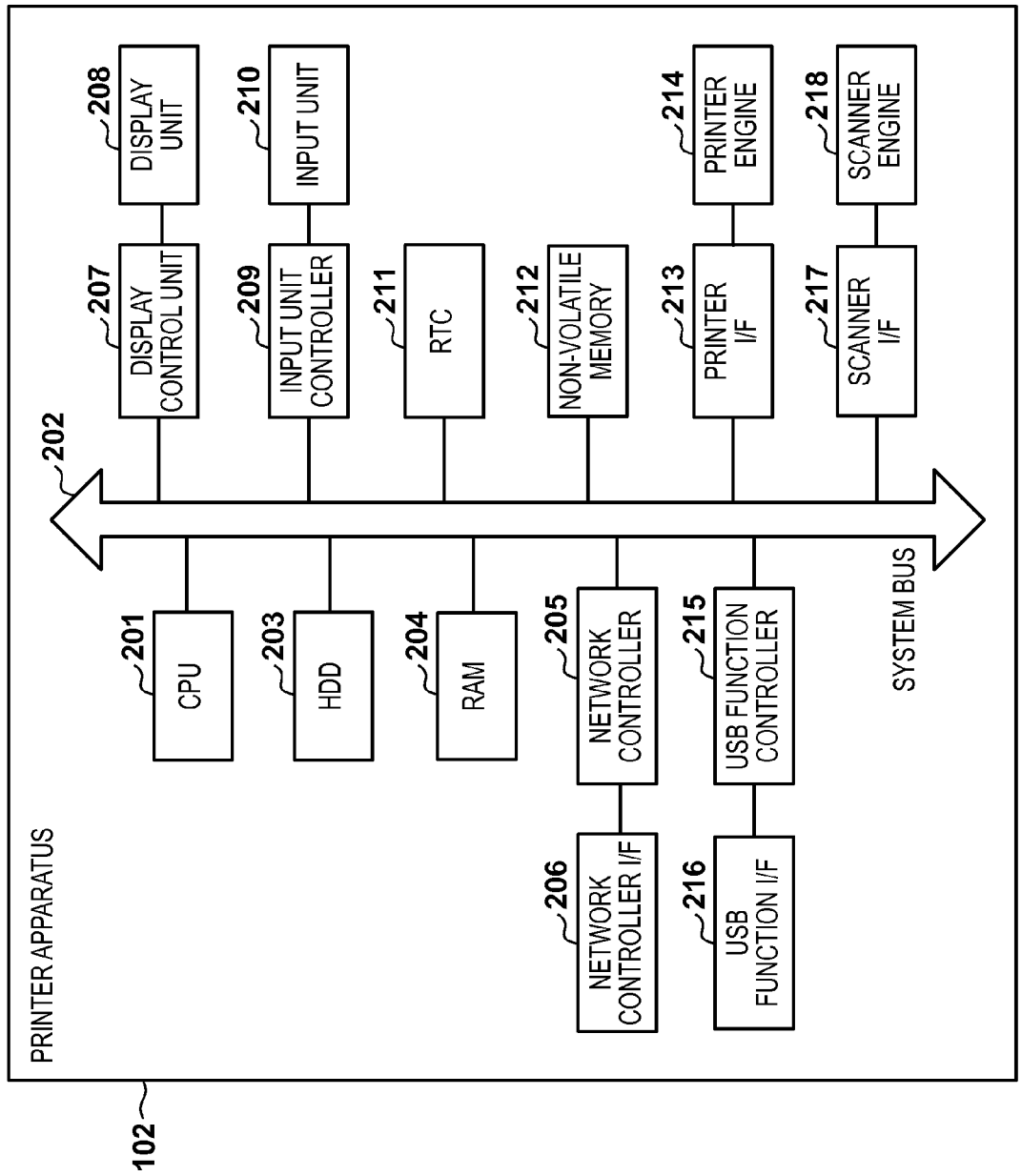
FIG. 2 is a block diagram for explaining a hardware configuration of a printer apparatus according to the first embodiment.

FIG. 2 is a block diagram for explaining a hardware configuration of the printer apparatus 102 according to the first embodiment.

A CPU 201 executes programs that are deployed into a RAM 204 and controls operation of the printer apparatus 102. These programs is installed together with an OS, or the like, in an HDD 203 (a hard disk drive), and upon electric power on, the CPU 201 executes a boot program that is stored in a non-volatile memory 212, and deploys programs and the OS that are stored in the HDD 203 into the RAM 204. Also, the HDD 203 stores a database and temporally storage files necessary to operate the printer apparatus 102 and software of the printer apparatus 102. Note that another large capacity non-volatile memory such as an SSD (Solid State Drive), a USB memory, or the like, may also be employed in place of the HDD 203. The RAM 204 provides a deploying area and a work area for a program of the CPU 201. A network controller 205 and a network controller interface 206 perform communication with the printer apparatus 102 and other equipment on a network. A USB function controller 215 and a USB function controller I/F 216 perform communication between the printer apparatus 102 and the PC 101 via USB. The USB function controller I/F 216 and the PC 101 are connected via a USB cable.

A display control unit 207 controls display to a display unit 208 and for example, performs display such that a user can confirm an operation status. An input unit 210 receives an instruction from a user to the printer apparatus 102. An input unit controller 209 controls an input of an instruction from the input unit 210. The input unit 210 more specifically is comprised of a keyboard and a pointing device, a 10 key, and a cursor keypad etc. In the case that the input unit 210 includes a touch panel, an instruction is input from a user via a screen of the display unit 208. An RTC 211 is a real-time clock that includes a clock function, an alarm function and a timer function etc. The non-volatile memory 212 may also be for example, a ROM, an SRAM and an EEPROM etc. A printer I/F 213 controls an interface with a printer engine 214. A scanner I/F 217 controls an interface with a scanner engine 218. A system bus 202 is connected with the CPU 201 and the above described memory and interfaces.

Next, an explanation will be given of a definition of a sleep state of the printer apparatus 102 according to the first embodiment.

When the printer apparatus 102 is in the sleep state, a supply of electric power to the HDD 203, the display control unit 207, the display unit 208, the non-volatile memory 212, the printer I/F 213, the printer engine 214, the scanner I/F 217, and the scanner engine 218 is stopped. A supply of electric power to the CPU 201, the RAM 204, the network controller I/F 206, the network controller 205, the USB function controller I/F 216, the USB function controller 215, the input unit controller 209 and the input unit 210 is maintained. Because of this, the printer apparatus 102 can return from the sleep state upon reception from a network, reception from the USB interface or an operation by a user to the input unit 210. Note that, even in the state that the supply of electric power is maintained to each part, for example, if a frequency of a clock of the CPU 201 is lowered, power consumption is suppressed compared to normal operation. Then, the CPU 201 is in a state in which it is able to receive an external interrupt that is a cause for returning from the sleep state.

Figure 3:
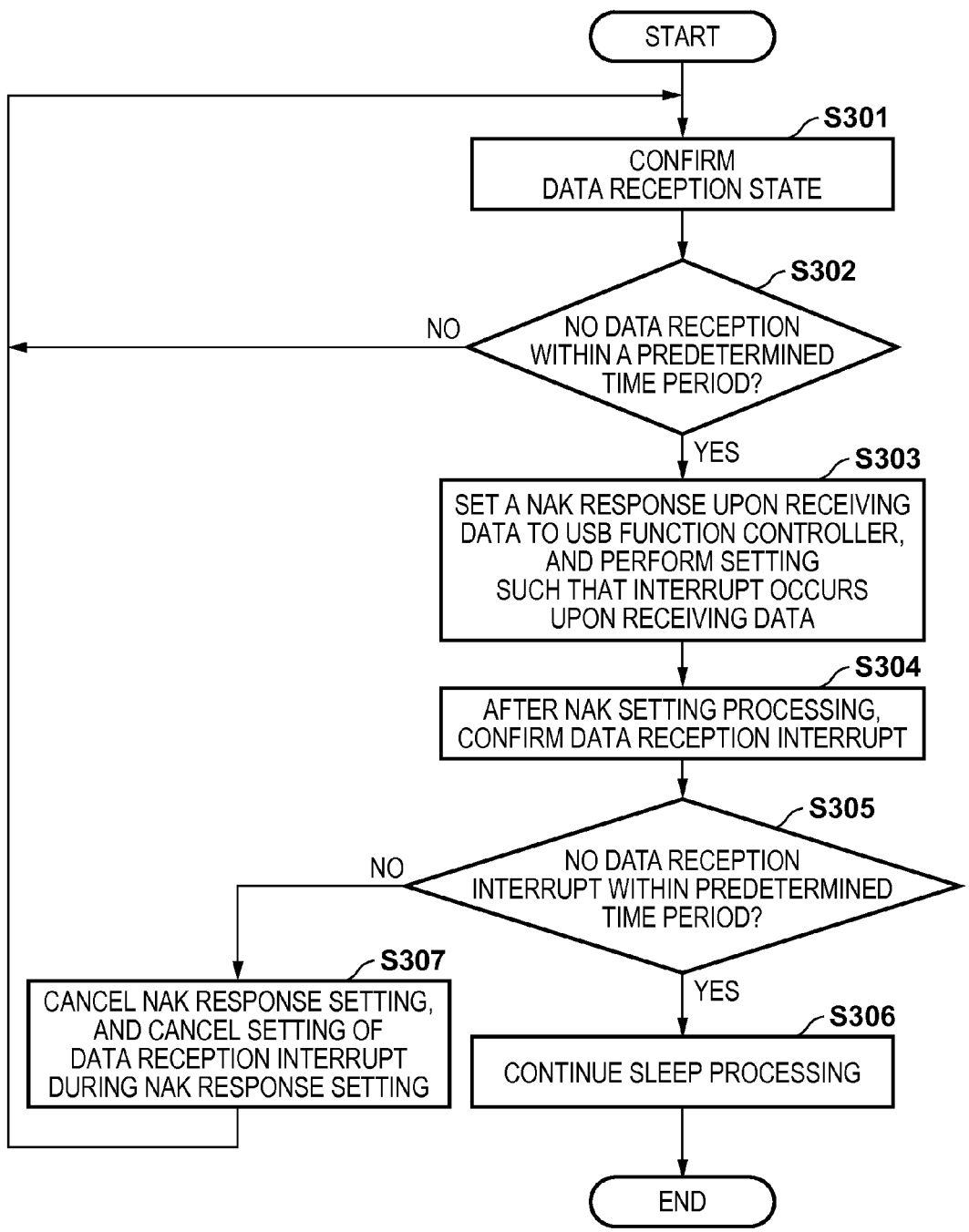
FIG. 3 is a flowchart for describing transition processing to a sleep state of the printer apparatus according to the first embodiment.

FIG. 3 is a flowchart for describing transition processing to a sleep state of the printer apparatus 102 according to the first embodiment. Note that, processing illustrated by the flowchart is achieved by the CPU 201 executing a program that is deployed into the RAM 204.

First, in step S301, the CPU 201 confirms whether or not print data is transmitted from the PC 101. Then in step S302, the CPU 201 determines whether or not print data or control data is received from the PC 101 in a predetermined time period, and if it is determined that there is no data transmission in the predetermined time period, the processing advances to step S303. Note that if it is determined that data transmission occurs in step S302, the processing returns to step S301. However, in this case, an SOF packet received from the PC 101 is not considered to be data.

In step S303, the CPU 201 sets the USB function controller 215 such that a NAK response is performed upon receiving data, also, a setting in which an interrupt is issued upon receiving data is performed such that the CPU 201 is notified that data is received from the PC 101, and the processing proceeds to step S304. In step S304, after the setting for the NAK response is performed, the CPU 201 determines whether or not data is received, namely, whether or not the interrupt is occurred, and if data reception is not detected within the predetermined time period, for example within 2 seconds, in step S305, the processing proceeds to step S306, and processing to continue the sleep processing is advanced. Afterwards, the printer apparatus 102 reduces electric power consumption and transitions to the sleep state.

On the other hand, in step S305, when the CPU 201 detects that reception of data occurs during the NAK response is set, the processing proceeds to step S307. In step S307, the CPU 201 cancels setting of the NAK response for the USB function controller 215 and releases a data reception interrupt setting during the time period during the NAK response is set, and the processing proceeds to step S301. In this way, by executing the processing in step S307, once again the printer apparatus 102 is able to receive print data from the PC 101, and when print data is received, print processing can be initiated.

Below, an explanation will be given with reference to FIG. 4 for a case of performing the processing of step S301→step S302→step S303→step S304→step S305→step S306 in the flowchart of FIG. 3, for a flow of communication processing via USB performed between the PC 101 and the printer apparatus 102.

Figure 4:
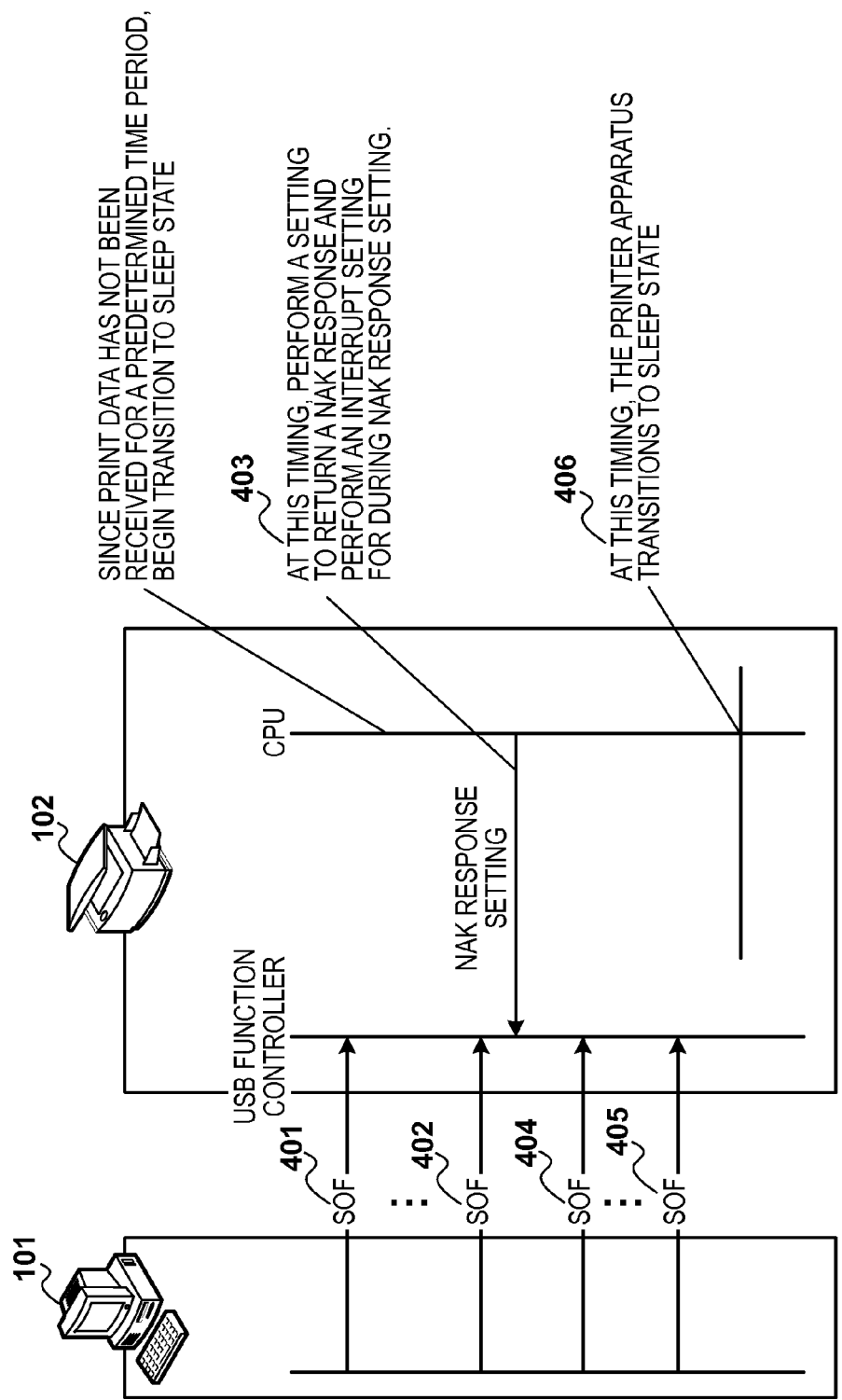
FIG. 4 is a sequence diagram for explaining an example of sending an SOF packet to the printer apparatus from the PC according to the first embodiment.

FIG. 4 is a sequence diagram for explaining an example of transmitting an SOF (Start of Frame) packet from the PC 101 according to the first embodiment to the printer apparatus 102.

Here since there is no print data for the PC 101 to transmit to the printer apparatus 102, SOF packets 401 and 402 are periodically transmitted. At this time, the packets which the printer apparatus 102 receives are SOF packets, and the printer apparatus 102 does not receive data packets. For this reason, in step S302 of FIG. 3 the CPU 201 determines that data is not received within a predetermined time period. Because of this, the CPU 201, as shown in step S303 of FIG. 3, performs setting of the NAK response and data reception interrupt setting during the NAK response being set on the USB function controller 215. This is denoted by reference numeral 403 in FIG. 4.

Afterwards the PC 101 transmits at regular intervals SOF packets 404 and 405 since print data does not exist. After this, a predetermined time period passes, the CPU 201 of the printer apparatus 102 in step S306 of FIG. 3 transitions to the sleep state. This corresponds to reference numeral 406 in FIG. 4. Therefore, after this, because the printer apparatus 102 becomes invisible to the PC 101, transmission of the SOF packets is stopped.

Next, an explanation will be given with reference to FIG. 3 in the case of performing the processes of step S301→step S302→step S303→step S304→step S305→step S307 in the flowchart of FIG. 5, for a flow of communication processing via USB which is performed between the PC 101 and the printer apparatus 102. This is an explanation of a case when the PC 101 transmits print data after the NAK response is set.

Figure 5:
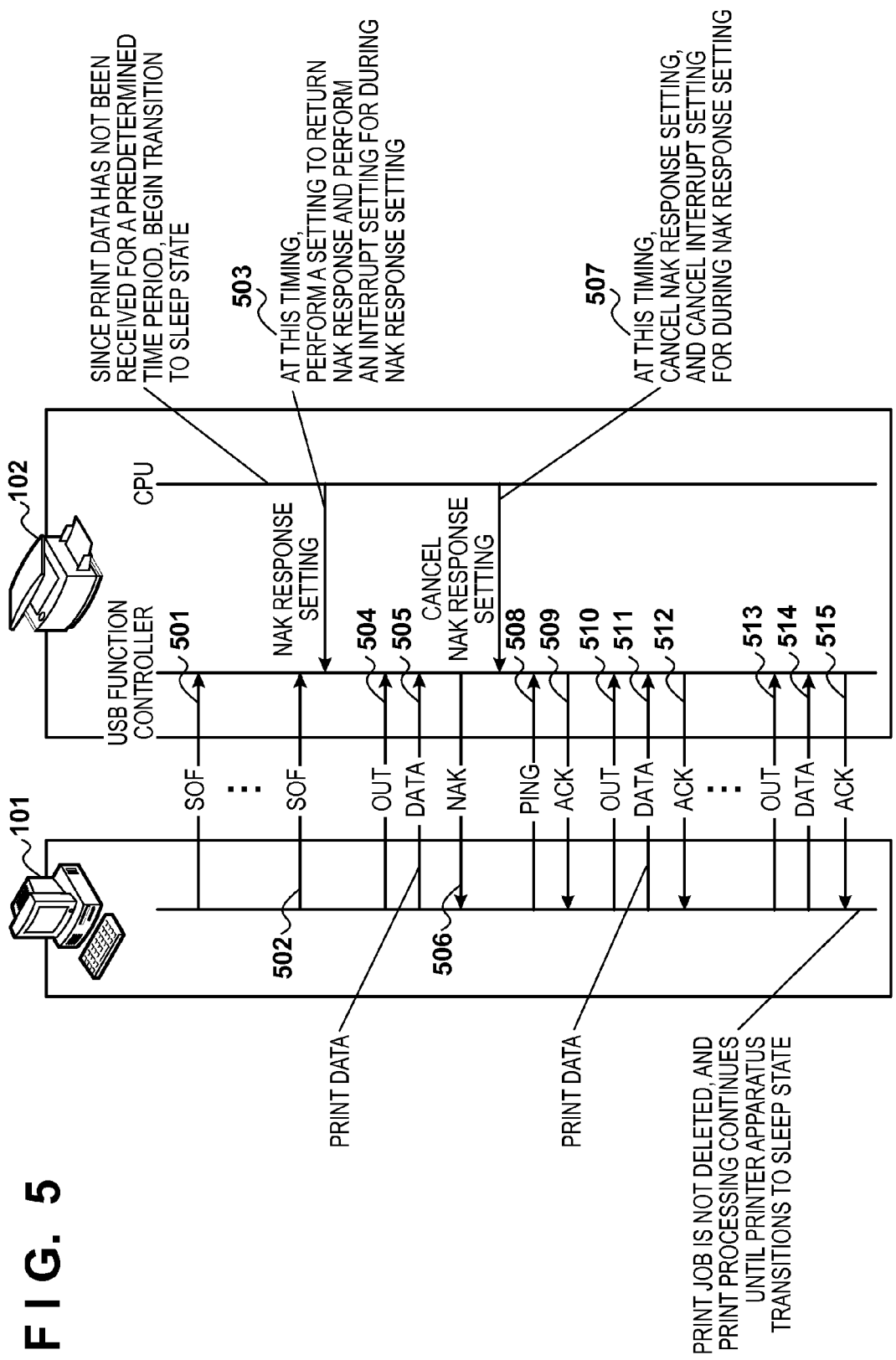
FIG. 5 is a sequence diagram for explaining an example of transmitting print data to the printer apparatus from the PC after setting a NAK (Negative ACKnowledge) response on the printer apparatus according to the first embodiment.

FIG. 5 is a sequence diagram for explaining an example of the PC transmitting print data to the printer apparatus 102 after the PC 101 sets the NAK response on the printer apparatus 102 according to the first embodiment.

Since there is no print data for the PC 101 to transmit to the printer apparatus 102, SOF packets 501 and 502 are periodically transmitted. At this time, since the printer apparatus 102 only receives SOF packets, and does not receive data packets for a predetermined time period, the CPU 201 determines in step S302 in FIG. 3 that there is no data reception for the predetermined time period. Because of this, the CPU 201 executes processing in step S303 which sets the NAK response for the USB function controller 215 and sets data reception interrupt for during the setting of the NAK response. This corresponds to a reference numeral 503 in FIG. 5. After this, in the case that the PC 101 transmits print data, first an output packet 504 is transmitted, and next data 505 is transmitted. At this time, since the printer apparatus 102 is already set to perform the NAK response, the printer apparatus replies with a NAK 506. At this time, due to the interrupt setting performed in step S303, the CPU 201 is notified that an interrupt occurred due to a reception of the data 505. When the CPU 201 receives an interrupt notification, the CPU 201 determines that there is a data reception interrupt by the determination in step S305, and the processing proceeds to step S307. Then the CPU 201 cancels the NAK response for the USB function controller 215, and cancels the data reception interrupt setting during setting of the NAK response. This corresponds to reference numeral 507 in FIG. 5.

Because of this, in order for the PC 101 to perform retry of a failed transmission of the data 505, a PING packet 508 is transmitted to confirm preparation of a response of the printer apparatus 102. At this time, since the printer apparatus 102 is in a state where it is possible to respond, the printer apparatus 102 returns an ACK 509. Note that at this time, if the setting processing in step S307 is not in time for the sending of the PING packet 508, the printer apparatus 102 returns a NAK. In this case, the PC 101 transmits a PING packet again until the PC 101 receives an ACK from the printer apparatus 102.

In this way, if the PC 101 receives the ACK 509, the PC 101 transmits an output packet 510 and data 511 to retry the previously failed transmission of the data 505. Because of this, since the printer apparatus 102 is able to receive the data 511, the printer apparatus 102 returns an ACK 512. Afterwards, if the print data continues, the PC 101 transmits data 514 and an output packet 513, the printer apparatus 102 returns an ACK 515, and it becomes possible for print processing to continue.

As explained above, according to this processing, when the printer apparatus attempts to transition to the sleep state, even in the case that the PC transmits print data after a NAK response has been set for a USB interface, printing can be executed without print data disappearing.

Below, an explanation will be given with reference to FIG. 6 for a communication sequence via USB is performed between the PC 101 and the printer apparatus 102 in the case of performing the processing in the order of step S301→step S302→step S303→step S304→step S305→step S307 or the flowchart of FIG. 3. This is an explanation of a case of a sequence when the PC 101 transmits print data immediately before the NAK response is set.

Figure 6:
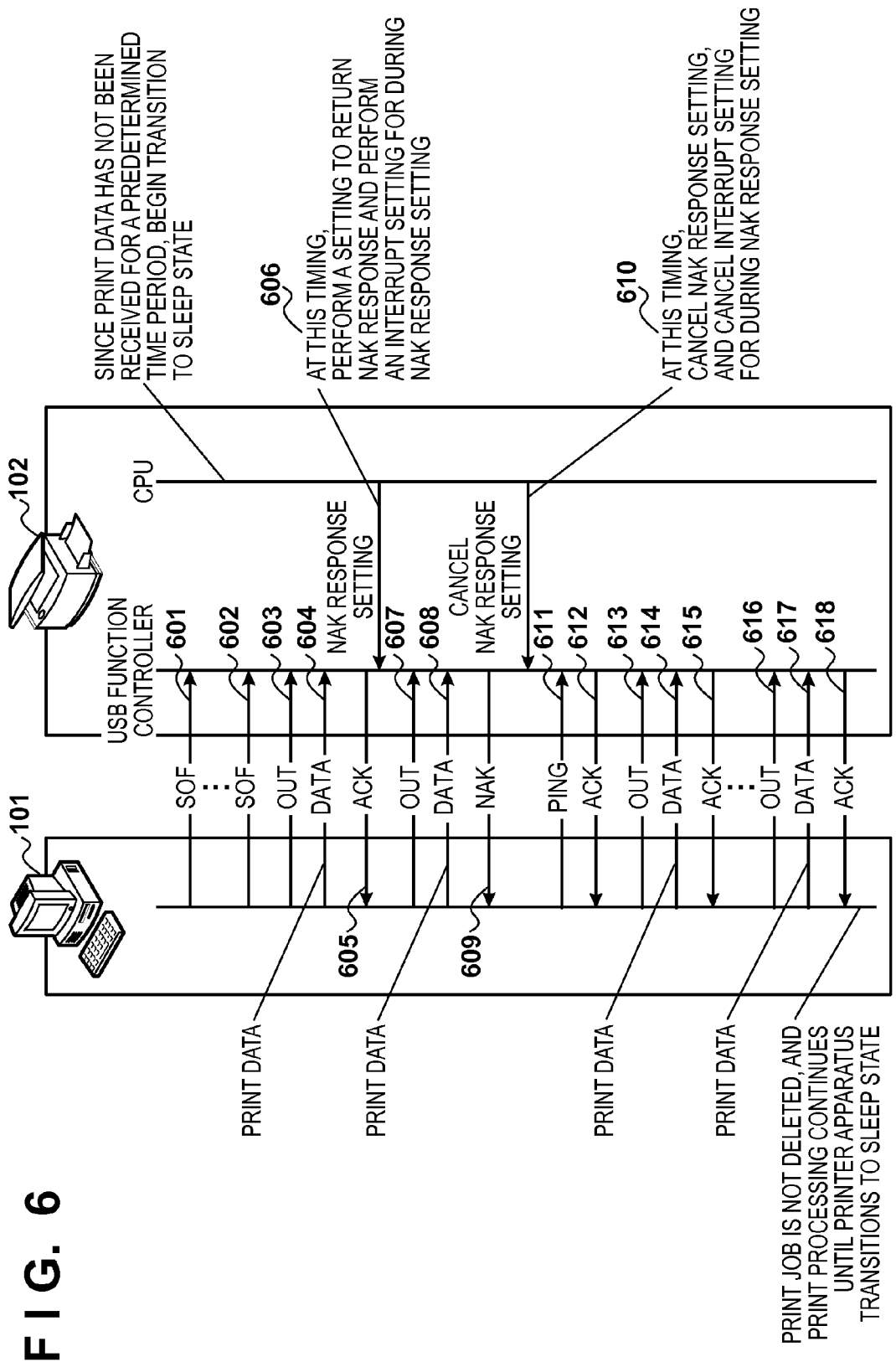
FIG. 6 is a sequence diagram for explaining an example of the PC transmitting print data to the printer apparatus immediately before a NAK response on the printer apparatus according to the first embodiment is set.

FIG. 6 is a sequence diagram for explaining an example of that the PC 101 transmits print data to the printer apparatus 102 immediately before the printer apparatus 102 sets the NAK response on the USB function controller 215 according to the first embodiment.

Since there is no print data for the PC 101 to transmit to the printer apparatus 102, SOF packets 601 and 602 are periodically transmitted. Because of this, since the received packets are only SOF packets and there are no data packets, in step S302 of FIG. 3, if the CPU 201 of the printer apparatus 102 determines that there is no data reception within a predetermined time period, the CPU 201 advances the processing to execute the processing in step S303. At this time, if the PC 101 transmits print data, the printer apparatus 102 receives a head of the print data. In other words, if the PC 101 transmits an output packet 603 and data 604 to the printer apparatus 102 before the printer apparatus 102 has set the NAK response and the data reception interrupt, the printer apparatus 102 which has not completed the processing in step S303 receives the data 604 and replies with an ACK 605. Since the USB function controller 215 responds with the ACK 605, the data reception interrupt has not reached the CPU 201 yet. In this way, the data reception interrupt setting and the NAK response setting of step S303 in FIG. 3 are performed after the printer apparatus 102 has responded with the ACK 605, as shown in reference numeral 606 of FIG. 6.

On the other hand, since the PC 101 has received the ACK 605, the PC 101 continues to attempt to transmit print data, and the PC 101 transmits an output packet 607 and data 608. In contrast to this, the printer apparatus 102 replies with a NAK 609 since the NAK response is set for data reception in the processing in step S303. Also, at this time, due to the data reception interrupt setting performed in step S303, the CPU 201 receives an interrupt notification. When the CPU 201 receives the interrupt notification, the CPU 201 determines that data reception has occurred due to the determination in step S305, the processing proceeds to step S307, the NAK response set on the USB function controller 215 is cancelled, and the data reception interrupt setting during the setting of the NAK response is cancelled. This is denoted by reference numeral 610 in FIG. 6.

Next, the PC 101 transmits a PING packet 611 to perform a response preparation confirmation for the printer apparatus 102, in order to perform a failed transmission retry due to receiving the NAK 609 for the data 608. At this time the printer apparatus 102 returns an ACK 612 since it has now in a state in which the printer apparatus 102 can respond by the processing in step S307. Note that, at this time, if the setting processing in step S307 is not performed prior to the transmission of the PING packet 611, a NAK is returned. In this case, the PC 101 transmits PING packets again until the PC 101 receives an ACK from the printer apparatus 102.

In this way, the PC 101 which receives the ACK 612 transmits an output packet 613 and data 614 in order to retry transmitting the data 608 that previously failed during transmission. At this time, since the printer apparatus 102 is capable of receiving the data 614, the printer apparatus 102 returns an ACK 615. Thereafter, the PC 101 sends an output packet 616 and data 617 in the case that print data continues, and the printer apparatus 102 becomes able to continue print processing by returning an ACK 618.

As explained above, according to this processing, when the printer apparatus attempts to transition to the sleep state, even in the case that the PC transmits print data before the NAK response is set for a USB interface, printing can be executed without the print data disappearing.

By the first embodiment, as explained above, even in the case that a PC transmits print data when a printer apparatus attempts to transition to a sleep state, printing can be executed without print data disappearing.

Second Embodiment

Next, a second embodiment of the present invention is explained. In the previously described first embodiment, an explanation was given for an example wherein, when, the PC 101 transmits print data within a predetermined time period after the printer apparatus 102 is set to perform the NAK response, the CPU 201 is able to receive the print data due to a setting for a data reception interrupt for during the NAK response.

In contrast to this, in the second embodiment, an explanation is given for an example in which print data does not disappear even when the print data is transmitted from the PC 101 while the printer apparatus 102 is transitioning to the sleep state, where only the setting of the NAK response is performed, and the data reception interrupt setting for during the NAK response is not performed. Note that, since the configuration of the printer apparatus 102 according to the second embodiment is the same as the previously described first embodiment, explanation will be omitted.

Figure 7:
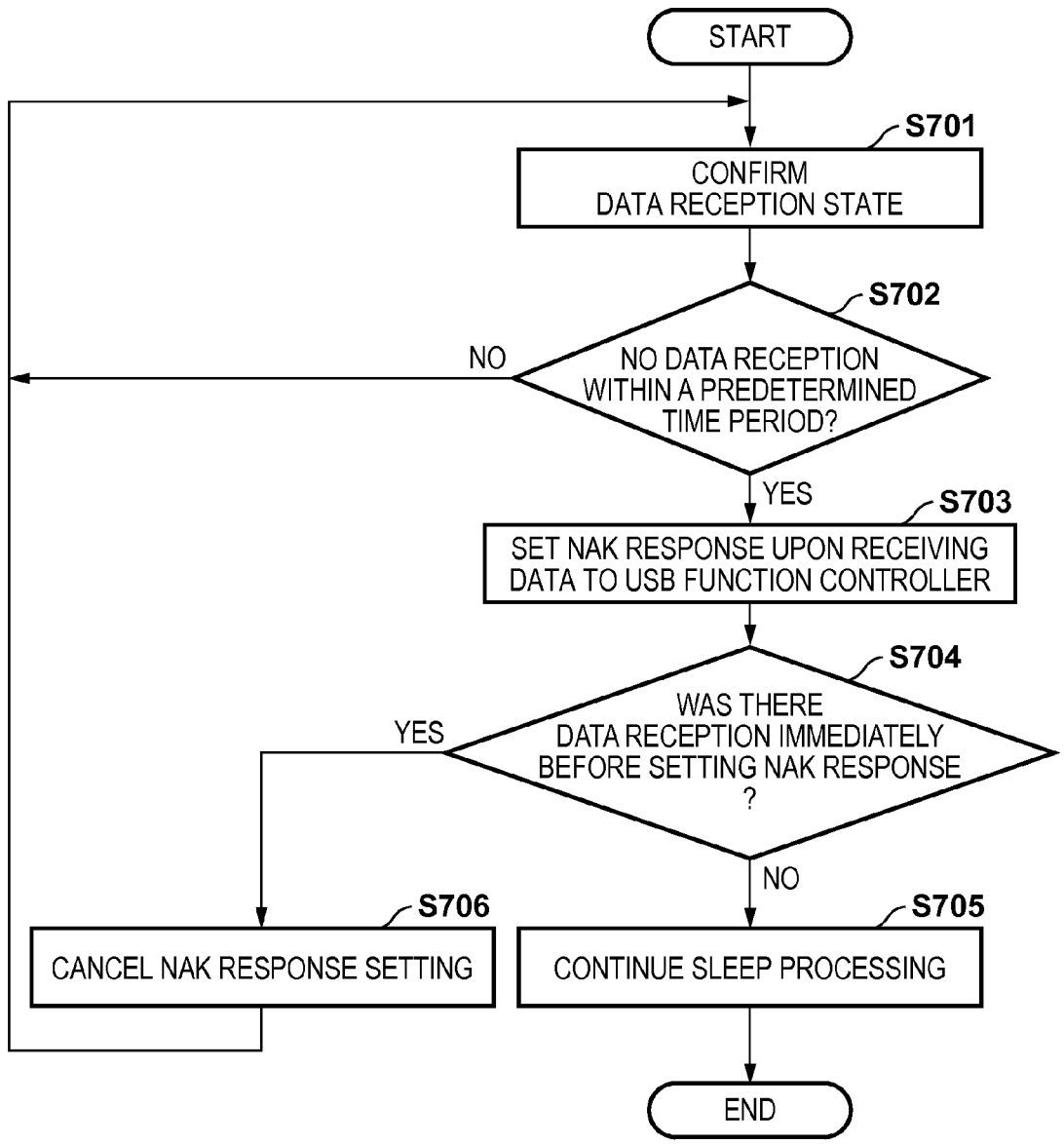
FIG. 7 is a flowchart for describing transition processing to a sleep state of the printer apparatus according to the second embodiment.

FIG. 7 is a flowchart for describing transition processing to a sleep state of the printer apparatus 102 according to the second embodiment. Note that, the processing illustrated by the flowchart is achieved by the CPU 201 executing a program that is deployed into the RAM 204. The processing illustrated by the flowchart is a case of processing wherein the printer apparatus 102 transitions to a sleep state wherein electric power consumption is reduced.

First, in step S701, the CPU 201 confirms whether or not print data is received from the PC 101. Then in step S702 if the CPU 201 determines that print data or control data is not received from the PC 101 in a predetermined time period, the processing advances to step S703. Based on the determination made in step S702, if it is determined that data is received, then the processing returns to step S701. However, in this case, an SOF packet is not determined to be data. In step S703, the CPU 201 sets the USB function controller 215 to perform setting the NAK response upon receiving data. Subsequently, the processing proceeds to step S704 and the CPU 201 determines whether or not data reception occurred immediately before the setting of NAK response in step S703 has been performed. In step S704, if the CPU 201 determines that no data reception occurred, the processing proceeds to step S705, the CPU 201 continues the processing for transitioning to the sleep state, and after this the printer apparatus 102 transitions to the sleep state wherein the electric power consumption is reduced.

On the other hand, in the case that, in the determination in step S704, the CPU 201 determines that data reception occurs immediately before the NAK response setting processing has completed, the processing proceeds to step S706 and the CPU 201 cancels the setting of the NAK response on the USB function controller 215. By executing the processing in step S706, once again the printer apparatus 102 is able to receive print data from the PC 101 and it is possible to resume print processing.

Next, an explanation will be given for a flow of a USB communication sequence which is performed between the PC 101 and the printer apparatus 102 with reference to FIG. 8 for a case in which the processing of step S701→step S702→step S703→step S704→step S705 that was explained in the flowchart of FIG. 7 is performed.

Figure 8:
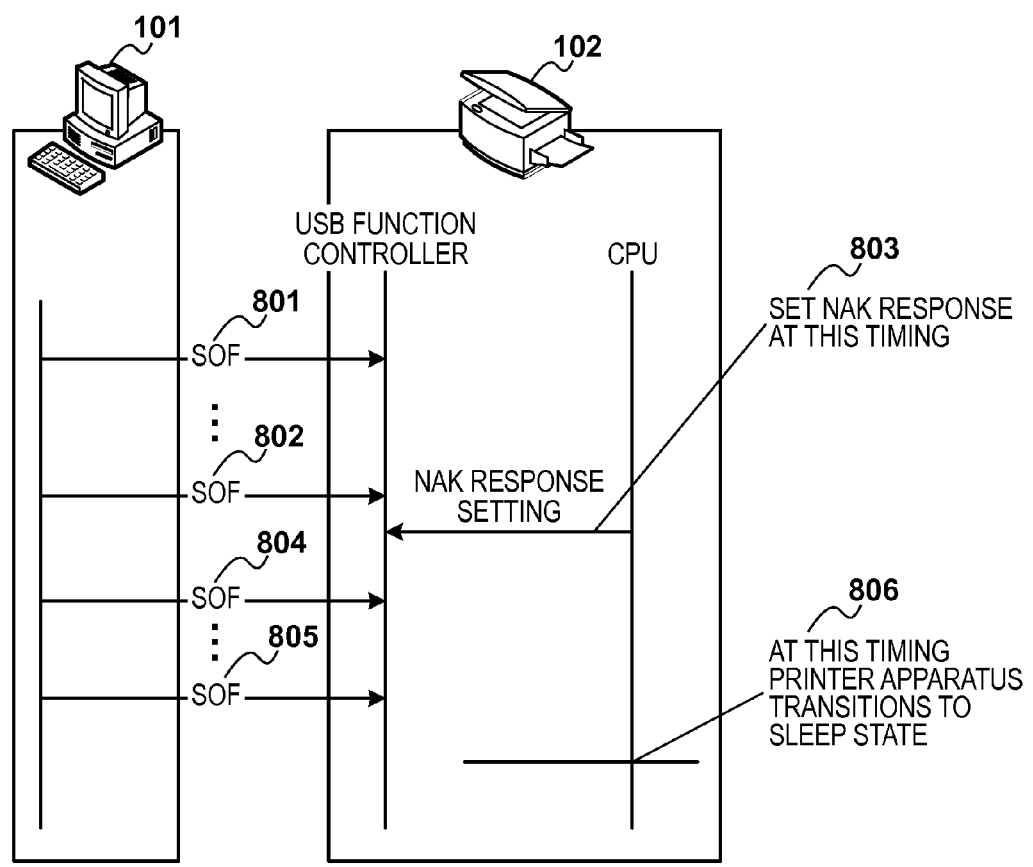
FIG. 8 is a sequence diagram for explaining an example of sending an SOF packet to the printer apparatus from the PC according to the second embodiment.

FIG. 8 is a sequence diagram explaining an example of transmitting an SOF packet from the PC 101 according to the second embodiment to the printer apparatus 102.

Here since there is no print data for the PC 101 to transmit to the printer apparatus 102, SOF packets 801 and 802 are periodically transmitted. Since the received packets are only SOF packets and there are no data packets, the CPU 201 of the printer apparatus 102 determines, in step S702, that there is no data reception within the predetermined time period. In step 803 of FIG. 8, the CPU 201 sets the USB function controller 215 to perform the NAK response, and executes processing in step S703 of FIG. 7. Afterwards the PC 101 transmits at regular intervals SOF packets 804 and 805 since print data does not exist. Because of this, the CPU 201 of the printer apparatus 102 determines that no data reception occurred immediately before processing of the NAK setting in step S704, the processing proceeds to step S705, and the printer apparatus 102 transitions to the sleep state. This is denoted by 806 in FIG. 8, and since the printer apparatus 102 becomes invisible to the PC 101, transmission of the SOF packets is stopped.

Next, an explanation will be given with reference to FIG. 9 for a case of performing the processing of step S701→step S702→step S703→step S704→step S706 in the flowchart of FIG. 7, for a flow of communication processing via USB performed between the PC 101 and the printer apparatus 102. This is an explanation of a case when the PC 101 transmits print data immediately before the NAK response has been set.

Figure 9:
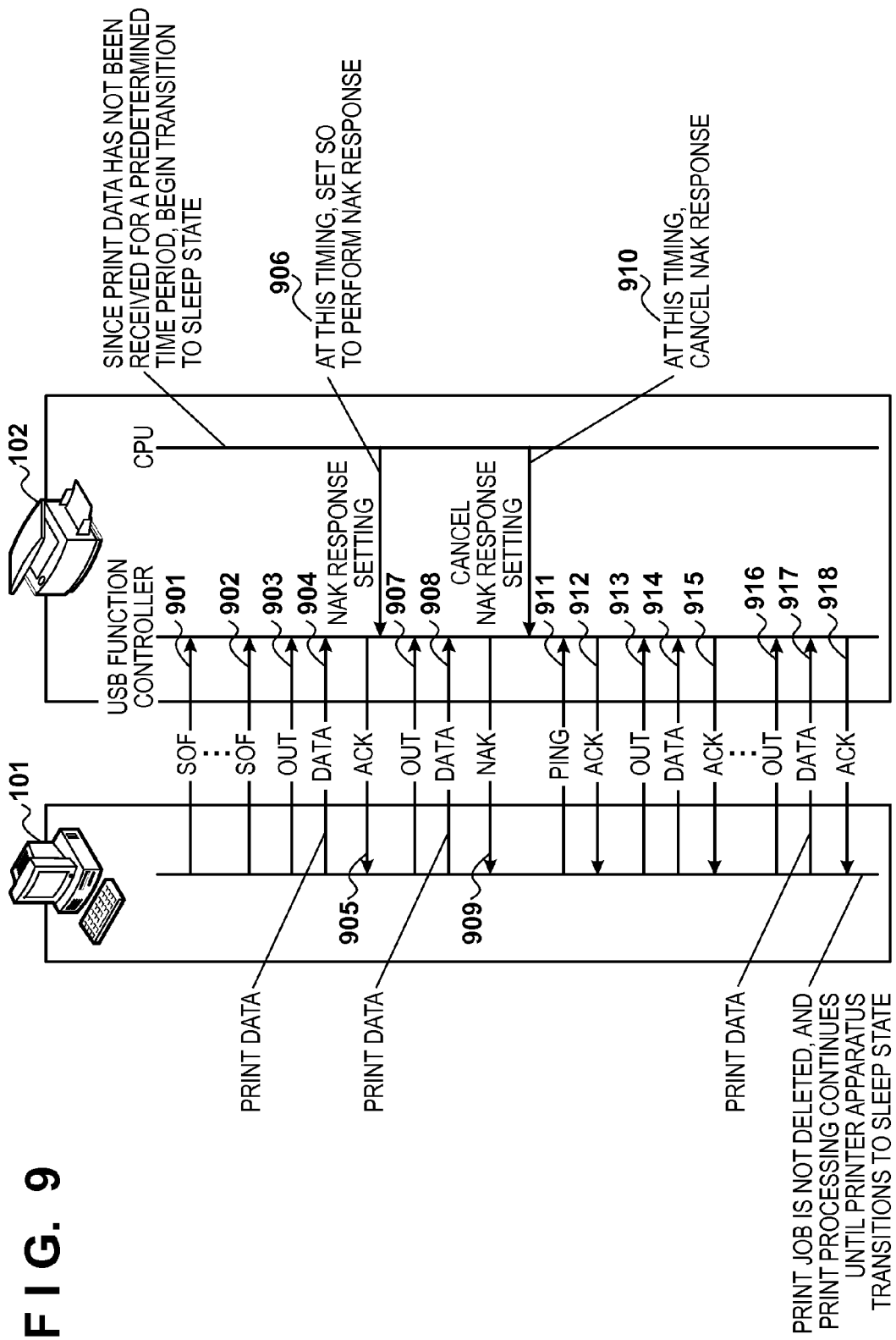
FIG. 9 is a sequence diagram for explaining an example of the PC transmitting print data to the printer apparatus immediately before a NAK response on the printer apparatus according to the second embodiment is set.

FIG. 9 is a sequence diagram for explaining an example in which print data is transmitted to the printer apparatus 102 immediately before the printer apparatus 102 sets the NAK response according to the second embodiment.

First, since there is no print data for the PC 101 to transmit to the printer apparatus 102, SOF packets 901 and 902 are periodically transmitted. Since the received packets are only SOF packets and there are no data packets, the CPU 201 of the printer apparatus 102 determines, in step S702, that there is no data reception within the predetermined time period. When the CPU 201 advances the processing to execute the processing in step S703, the printer apparatus 102 receives a head of print data when the PC 101 transmits the print data. In other words, when the PC 101 transmits an output packet 903 and data 904 to the printer apparatus 102, the printer apparatus 102 which has not completed the processing in step S703 receives the data 904 and replies with an ACK 905. In this case, since the USB function controller 215 responds with the ACK 905, the CPU 201 does not know yet that the data 904 has been received.

Next, in 906, before a data reception interrupt reaches the CPU 201, there exists a timing at which the processing in step S703 is executed. Here, since the PC 101 has received the ACK 905, the PC 101 continues to attempt to transmit print data, and the PC 101 transmits an output packet 907 and data 908. At this time, the printer apparatus 102 replies with a NAK 909 since the NAK response is set for data reception in the processing in step S703. Then, at a timing that is close to this, an interrupt due to reception of the data 904 reaches the CPU 201. In this way, when the CPU 201 receives the interrupt notification, the CPU 201 determines that data reception has occurred due to the determination in step S704, the processing proceeds to the processing in step S706, and the NAK response setting for the USB function controller 215 is cancelled. This is denoted by reference numeral 910 in FIG. 9.

On the other hand, since the PC 101 receives the NAK 909, a failed transmission retry for the data 908 is performed. Then, first a PING packet 911 is transmitted to confirm preparation of a response to the printer apparatus 102. At this time, the printer apparatus 102 returns an ACK 912 since the printer apparatus 102 has now in a state in which it can respond by the processing in step S706. Note that, at this time, if the setting processing in step S706 does not occur before transmission of the PING packet 911, a NAK is returned. In this case, the PC 101 transmits a PING packet again until the PC 101 receives an ACK from the printer apparatus 102. In this way, the PC 101 which receives the ACK 912 transmits an output packet 913 and data 914 in order to retry transmission of the data 908 for which there was transmission failure previously. At this time, since the printer apparatus 102 is able to receive the data 914, the printer apparatus 102 returns an ACK 915. Afterwards, in the case that print data continues, the PC 101 transmits an output packet 916 and data 917, the printer apparatus 102 returns an ACK 918, and the printer apparatus 102 becomes possible for print processing to continue.

Next, an explanation will be given with reference to FIG. 10 for a case of performing the processing of step S701→step S702→step S703→step S704→step S705 in the flowchart of FIG. 7, for a flow of communication processing via USB performed between the PC 101 and the printer apparatus 102. This is an explanation of a case of a communication sequence when the PC 101 transmits print data after the NAK response has been set.

Figure 10:
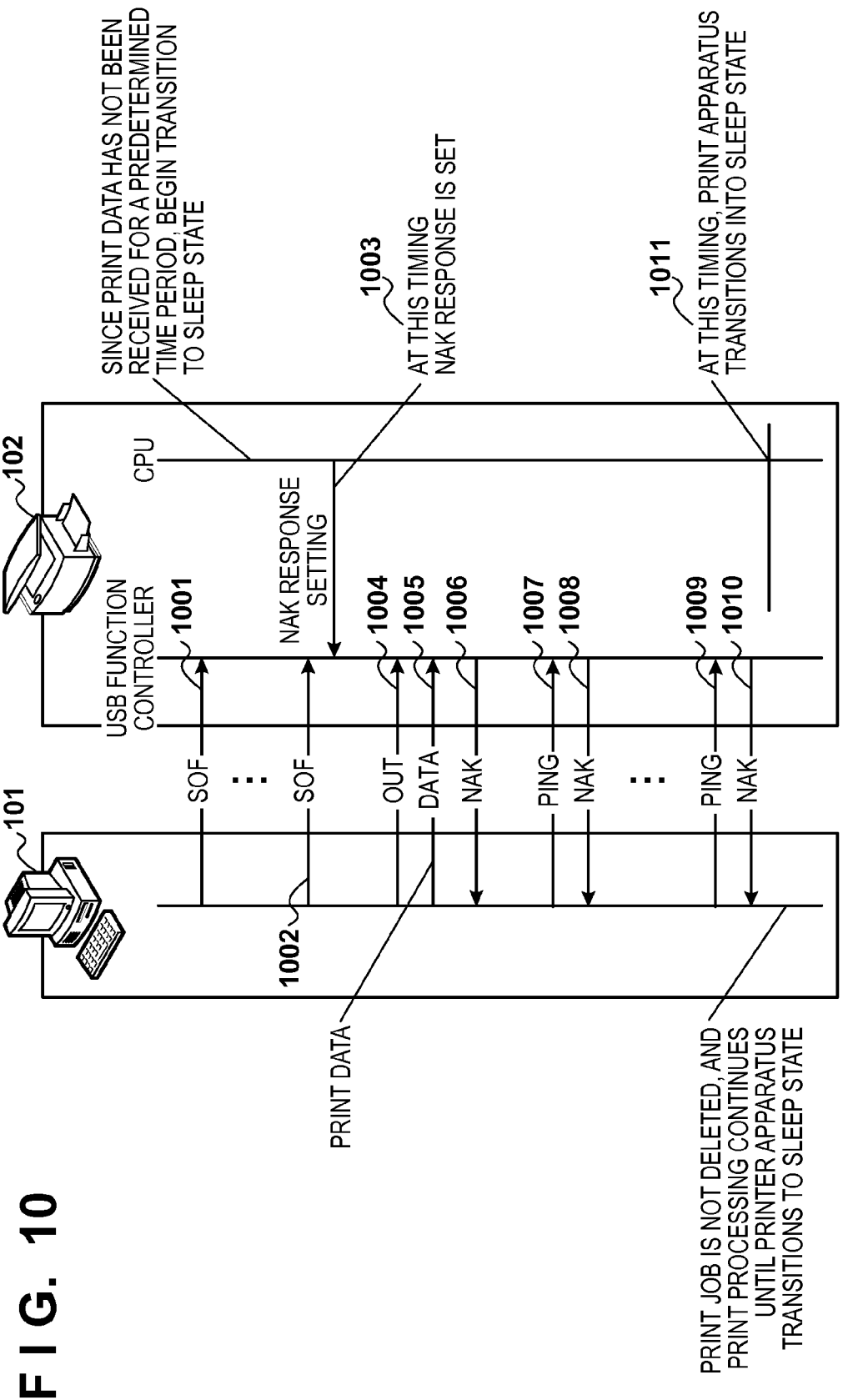
FIG. 10 is a sequence diagram for explaining an example of communication in the case of a PC transmitting print data after the NAK response is set on the printer apparatus according to the second embodiment.

FIG. 10 is a sequence diagram for explaining an example of communication sequence for explaining an example in the case of the PC 101 transmitting print data to the printer apparatus 102 after the printer apparatus 102 sets the NAK response according to the second embodiment.

First, since there is no print data for the PC 101 to transmit to the printer apparatus 102, SOF packets 1001 and 1002 are periodically transmitted. Since the received packets are only SOF packets and there are no data packets, the CPU 201 of the printer apparatus 102 determines, in step S702, that there is no data reception within the predetermined time period. Then the processing proceeds to step S703 and the CPU 201 executes processing for setting the NAK response for the USB function controller 215. This is corresponds to reference numeral 1003 in FIG. 10. After this, if the PC 101 transmits print data, first an output packet 1004 is transmitted, and next data 1005 is transmitted. At this time, since the printer apparatus 102 has been already set to perform the NAK response, the printer apparatus 102 replies with a NAK 1006. At this time in the second embodiment, since a data reception interrupt setting during the NAK response has not been performed, the CPU 201 does not notice the reception of the data 1005 even if a predetermined time elapses.

Next, since the PC 101 received the NAK 1006, the PC 101 transmits a PING packet 1007 to confirm response preparation of the printer apparatus 102. In response to this, the printer apparatus 102 returns a NAK 1008 once again since the NAK response is being set. Then, the PC 101 repeatedly transmits a PING packet 1009 until the CPU 201 executes the processing in step S705, and the printer apparatus 102 continues to return a NAK 1010.

In this way, next, when processing proceeds to step S705 and the CPU 201 performs processing for transitioning into the sleep state, the printer apparatus 102 enters the sleep state wherein the electric power consumption is reduced. In this way, when processing in step S705 is executed and the electric power of the printer apparatus 102 is turned off, the printer apparatus 102 becomes invisible to the PC 101, and hereinafter, the PC 101 does not transmit either PING packets or SOF packets. In this way, the printer apparatus 102 transitions to the sleep state in a state of that the PC 101 cannot transmit the data 1005 to the printer apparatus 102. This is denoted by reference numeral 1011 in FIG. 100.

However, at this time, since the PC 101 does not transmit even one byte of print data to the printer apparatus 102, the print data accumulates in a print spooler of the PC 101 without being discarded. After this, the PC 101 is capable of transmitting the print data that accumulated in the print spooler after the printer apparatus 102 returns from the sleep state. In this way, it is possible to avoid print data disappearing.

By the second embodiment, as explained above, even in the case that print data is transmitted by a PC to a printer apparatus when the printer apparatus transitions to the sleep state, printing can be executed without causing the print data to disappear. Then, when the print processing ends, the printer apparatus is able to transition to the sleep state. Note that, depending on the timing, which there is a case where print processing cannot be completed before the printer apparatus 102 transitions to the sleep state, but print processing can be completed when the printer apparatus 102 returns from the sleep state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095504, filed May 2, 2014, which is hereby incorporated by reference herein in its entirety.

What is claimed is:

1. An information processing apparatus having an interface for communicating with an external apparatus, the information processing apparatus comprising:
   a processor;
   a memory;
   a detection unit configured to detect that a transition condition for the information processing apparatus to transition into a sleep mode is satisfied;
   a setting unit configured to set, for the interface, (a) a NAK response setting for indicating that a NAK response is performed upon a data reception and (b) an interrupt setting for indicating that an interrupt is caused to occur upon a reception of data, in a case where the detection unit detects that the transition condition is satisfied; and
   a controlling unit configured to stop a transition to the sleep mode, when the interrupt is caused to occur during the interval after the setting unit has set the NAK response setting and the interrupt setting to the interface until the transition to the sleep mode is completed, and to cancel the NAK response setting and the interrupt setting set to the interface,
   wherein the detection unit, the setting unit and the controlling unit are implemented at least in part by the processor executing at least one program recorded on the memory.

2. The information processing apparatus according to claim 1, further comprising:
   a processing unit configured to execute, in a case where the transition to the sleep mode is cancelled by the controlling unit, processing corresponding to a received data that is a cause for the interrupt to occur,
   wherein the processing unit is implemented by the processor executing at least one program recorded on the memory.

3. The information processing apparatus according to claim 1, wherein the interface is a USB interface.

4. The information processing apparatus according to claim 1, wherein the information processing apparatus is a printing apparatus.

5. The information processing apparatus according to claim 1, wherein the transition condition is that a data reception does not occur for a predetermined time period.

6. A method of controlling an information processing apparatus having an interface for communicating with an external apparatus, the method comprising:
   detecting that a transition condition for the information processing apparatus to transition into a sleep mode is satisfied;
   setting, for the interface, (a) a NAK response setting for indicating that a NAK response is performed upon a data reception and (b) an interrupt setting for indicating that an interrupt is caused to occur upon a reception of data, in a case where it is detected that the transition condition is satisfied;
   stopping, when the interrupt is caused to occur during the interval after the NAK response setting and the interrupt setting are set to the interface until the transition to the sleep mode is completed, a transition to the sleep mode and cancelling the NAK response setting and the interrupt setting set to the interface.

7. A non-transitory computer-readable storage medium storing a program for causing a computer to function as an information processing apparatus having an interface for communicating with an external apparatus, the information processing apparatus comprising:
   a detection module for detecting that a transition condition for the information processing apparatus to transition into a sleep mode is satisfied;

a setting module for setting, for the interface, (a) a NAK response setting for indicating that a NAK response is performed upon a data reception and (b) an interrupt setting for indicating that an interrupt is caused to occur upon a reception of data, in a case where the detection module detects that the transition condition is satisfied; and a controlling module for stopping a transition to the sleep mode, in a case where the interrupt is caused to occur during the interval after the setting module has set the NAK response setting and the interrupt setting to the interface until the transition to the sleep mode is completed, and cancelling the NAK response setting and the interrupt setting set to the interface.

8. An information processing apparatus having an interface for communicating with an external apparatus, the information processing apparatus comprising:

a processor;

a memory;

a detection unit configured to detect that a transition condition for the information processing apparatus to transition into a sleep mode is satisfied;

a setting unit configured to set, for the interface, (a) a NAK response setting for indicating that a NAK response is performed upon a data reception and (b) an interrupt setting for indicating that an interrupt is caused to occur upon the data reception, in a case where the detection unit detects that the transition condition is satisfied; and a controlling unit configured to stop a transition to the sleep mode, when the interrupt is caused to occur during the interval after the setting unit has set the NAK response setting and the interrupt setting to the interface until a predetermined time period has elapsed, and to cancel the NAK response setting and the interrupt setting set to the interface, wherein the detection unit, the setting unit and the controlling unit are implemented at least in part by the processor executing at least one program recorded on the memory.

9. The information processing apparatus according to claim 8, further comprising:

a processing unit configured to execute, in a case where the transition to the sleep mode is cancelled by the controlling unit, processing corresponding to a received data that is a cause for the interrupt to occur, wherein the processing unit is implemented by the processor executing at least one program recorded on the memory.

10. The information processing apparatus according to claim 8, wherein the interface is a USB interface.

11. The information processing apparatus according to claim 8, wherein the information processing apparatus is a printing apparatus.

12. A method of controlling an information processing apparatus having an interface for communicating with an external apparatus, the method comprising:

detecting that a transition condition for the information processing apparatus to transition into a sleep mode is satisfied;

setting, for the interface, a NAK response setting for indicating that a NAK response is performed upon a data reception and an interrupt setting for indicating that an interrupt is caused to occur upon the data reception, in a case where it is detected in the detecting that the transition condition is satisfied; and stopping a transition to the sleep mode, when the interrupt is caused to occur during the interval after the NAK response setting and the interrupt setting are set to the interface until a predetermined time period has elapsed, and cancelling the NAK response setting and the interrupt setting set to the interface.

13. A non-transitory computer-readable storage medium storing a program for causing a computer to function as an information processing apparatus having an interface for communicating with an external apparatus, the information processing apparatus comprising:

a detection module for detecting that a transition condition for the information processing apparatus to transition into a sleep mode is satisfied;

a setting module for setting, for the interface, (a) a NAK response setting for indicating that a NAK response is performed upon a data reception and (b) an interrupt setting for indicating that an interrupt is caused to occur upon the data reception, in a case where the detection module detects that the transition condition is satisfied; and a controlling module for stopping a transition to the sleep mode, when the interrupt is caused to occur during the interval after the setting module has set the NAK response setting and the interrupt setting to the interface until a predetermined time period has elapsed, and cancelling the NAK response setting and the interrupt setting set to the interface.

* * * * *